United States Patent [19]

Gellert

[11] 4,438,325
[45] Mar. 20, 1984

[54] TUBULAR ELONGATED INJECTION MOLDING ELECTRIC HEATING ELEMENT WITH SPACER CLIPS

[76] Inventor: Jobst U. Gellert, 7A Prince St., Glen Williams, Canada

[21] Appl. No.: 334,154

[22] Filed: Dec. 24, 1981

[30] Foreign Application Priority Data

Dec. 10, 1981 [CA] Canada ................................ 392020

[51] Int. Cl.³ ............................................ H05B 3/06
[52] U.S. Cl. ................................. 219/536; 174/99 R; 219/421; 219/437; 219/523; 219/532; 219/548; 219/552; 425/551
[58] Field of Search ............... 219/336, 421, 437, 438, 219/441, 475, 523, 530, 540, 542, 544, 548, 213, 402, 408, 526, 532, 536, 537, 552, 553; 425/144, 143, 548, 549, 568, 550, 551; 222/146 HE; 338/315; 174/99 R, 138 G, 138 J

[56] References Cited

U.S. PATENT DOCUMENTS

| | | | |
|---|---|---|---|
| 1,046,722 | 12/1912 | Beadle | 174/99 R |
| 2,980,820 | 4/1961 | Brundige et al. | 219/535 |
| 3,331,946 | 7/1967 | Bilgro | 219/535 |
| 3,394,243 | 7/1968 | Lee | 219/536 X |
| 3,453,417 | 7/1969 | Hummel | 219/536 |
| 3,495,072 | 2/1970 | Fischer | 219/536 X |
| 4,051,346 | 9/1977 | Lenmark | 219/536 X |
| 4,066,201 | 1/1978 | Blackmann | 219/540 X |
| 4,230,934 | 10/1980 | Beck et al. | 219/421 |
| 4,238,671 | 12/1980 | Gellert | 219/421 |
| 4,241,291 | 12/1980 | Carnes | 219/536 |
| 4,279,588 | 7/1981 | Gellert | 425/568 |
| 4,287,408 | 9/1981 | Wilson | 219/421 X |
| 4,304,544 | 12/1981 | Crandell | 425/549 |
| 4,344,750 | 8/1982 | Gellert | 425/548 |

Primary Examiner—Volodymyr Y. Mayewsky
Attorney, Agent, or Firm—Riches, McKenzie & Herbert

[57] ABSTRACT

This invention relates to a spacer clip for an injection molding electric heating element. A number of clips, each formed of a continuous band, are slipped over one end of the heating element and slid along to predetermined positions. Each clip is then crimped to the heating element in that position which forms a finger which extends radially from the heating element in a predetermined orientation. The heating element with the spacer clips attached is located in a suitable mold for casting and the fingers of the clips locate each coil of the element with sufficient clearance from the mold and the other coils. The thickness of the conductive heater cast around the heating element is important to provide uniform heat transfer. The spacer clips are formed of a material such as stainless steel which has sufficient pliability to be securely crimped to the heating element, but sufficient strength to reliably retain the heating element in position. In one embodiment, the projecting finger may be twisted to give it additional regidity. This structure has the advantage over previous spacer plates that no extensive fault lines are formed by the spacer clips.

5 Claims, 8 Drawing Figures

4,438,325

TUBULAR ELONGATED INJECTION MOLDING ELECTRIC HEATING ELEMENT WITH SPACER CLIPS

BACKGROUND OF THE INVENTION

This invention relates to electric heating elements for injection molding systems and more particularly to spacer clips for properly locating the heating elements.

As is well known, the adequacy of the provision for heating in an injection molding system is critical to its satisfactory performance. Accordingly, the concept of casting an electrical heating element into a heater cast is well known in the art, one example of which is shown in the applicant's previous U.S. Pat. No. 4,222,733 wherein an electrical heating coil is cast into a beryllium copper heater cast. This structure has the advantage that it provides for the rapid dissipation of heat away from the heating element and for its relatively even distribution along the hot runner passage.

However, in order to provide for optimum heat flow characteristics, while maintaining the necessary structural strength, it is essential that the coils of the heating element be accurately located with respect to one another and in the heater cast. In the past, this has been provided by using a spacer plate to locate the heating element coils during casting which extends in a vertical plane from the coils to the outside of the cast over a considerable portion of the height of the cast. This plate has had the disadvantage of forming a vertical fault line in the cast which has resulted in an unacceptable failure ratio when the heater cast is subjected to repeated high loading forces during use.

In order to overcome this problem, it is necessary to provide for the accurate and reliable location of the heating element coils during casting without unduly weakening the structure of the heater cast or other body into which the heating element is cast.

SUMMARY OF THE INVENTION

Accordingly, it is an object of the present invention to at least partially overcome these disadvantages by providing spacer clips for attachment at particular locations along the coils of the heating element whereby a structural fault line is not formed in the heater cast.

To this end, in one of its aspects, the invention provides a spacer clip for an elongated injection molding electric heating element, the spacer clip comprising a band forming an opening therethrough, the size of the opening being greater than the size of the heating element whereby an end of the heating element may be inserted through the opening and the band slipped along the heating element to a predetermined position, the band adapted to be crimped around the heating element whereby a first portion of the band is forced into contact against the outer surface of the heating element and a second portion of the band is shaped to form a radially extending finger, the band being formed of a material having a combination of the necessary strength and pliability whereby the contact between the first portion of the band and the heating element secures the clip in said position and in a predetermined orientation against longitudinal or rotational motion relative to the heating element and the finger has sufficient rigidity to provide a minimum spacing from a body against which the finger projects at least equal to the length of the finger.

Further objects and advantages of the invention will appear from the following description, taken together with the accompanying drawings.

DESCRIPTION OF THE PREFERRED EMBODIMENTS

Figure 1:
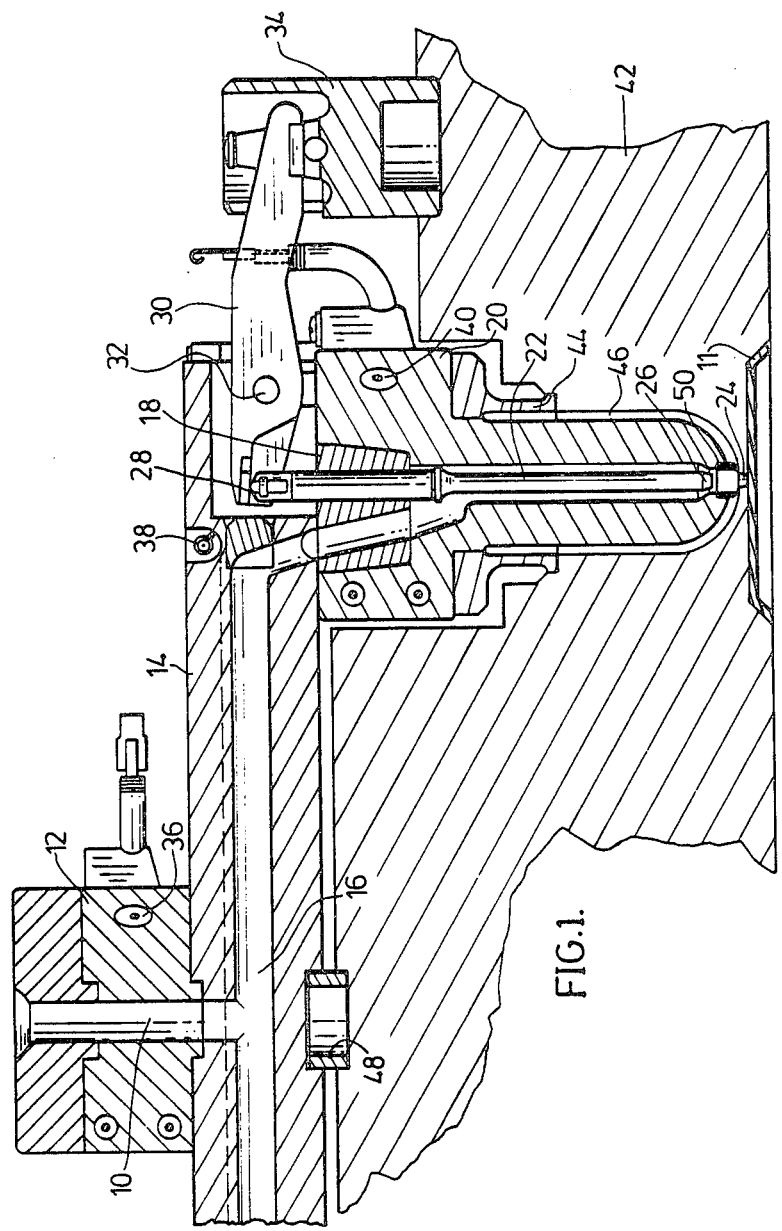
FIG. 1 is a partial sectional view of an injection molding system showing three heated members formed utilizing spacer clips according to preferred embodiments of the invention.

Reference is first made to FIG. 1 which shows a portion of a valve gated injection molding system. Pressurized melt flows through a hot runner passage 10 from a molding machine which is not shown to a cavity 11 in a mold. The hot runner passage 10 extends through a first heater cast 12 into a heated manifold 14 where it branches in opposite directions. One branch 16 runs along the manifold 14, through a bushing seal 18 seated in a second heater cast 20 and around a valve pin 22 which extends centrally through the heater cast 20. The flow of pressurized melt along the hot runner passage 10 and through gate 24 into the cavity 11 is controlled by the valve pin 22 as well as by the melt pressure applied by the molding machine. The valve pin 22 has a tip end 26 which seats in the gate 24 in the closed position and a driven end 28. The valve pin 22 is driven to the closed position by rocker arm 30 which is pivoted around pivot pin 32 by pneumatic cylinder 34. The melt pressure is then reduced and after a cooling period, the mold is opened to eject the part. After the mold is closed again, high melt pressure is reapplied which actuates the valve pin 22 to the open position for injection and the sequence is repeated.

It is critical that the melt in the hot runner passage be maintained within a predetermined temperature range depending upon the material being run. Thus, the hot runner passage 10 first extends through a heater cast 12 which is heated by a coiled electric heating element 36. It then runs along the manifold 14 which is heated by a longitudinal extending electric heating element 38, and through the heater cast 20 which is heated by another coiled electric heating element 40. The heater cast 20 is seated in a cooled cavity plate 42 by insulation bushing 44 which provides an insulative air space 46 therebetween. The insulative air space 46 similarly extends between the heated manifold 14 and the cooled cavity plate which are separated by cylindrical spacer 48. The heater cast 20 is formed of a highly conductive material such as a berylluim copper alloy and a nozzle seal 50 is provided around the gate 24.

Figure 2:
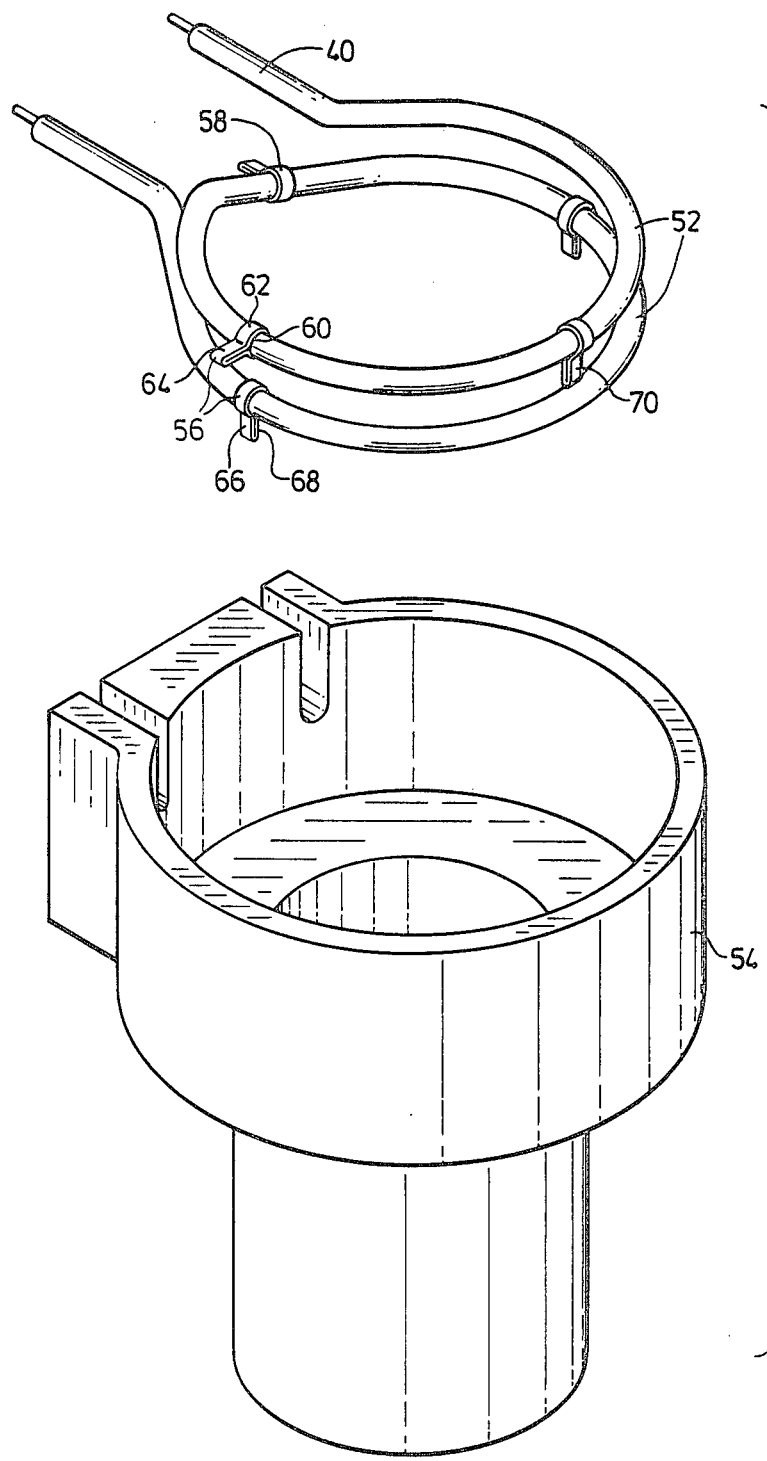
FIG. 2 is an isometric view of a heating element in readiness for location in a mold for casting a heater cast as seen in FIG. 1.

FIGS. 2-5 illustrate in detail the structure of the heater cast 20. Referring first to FIG. 2, an electric heater element 40 having two coils 52 is shown in position for location in a mold 54 prior to casting of the berylluim copper alloy. As may be seen, a number of spacer clips 56 according to a first embodiment of the invention have been attached in predetermined positions around the coils so that the heater element 40 will be properly located in the mold and also to ensure that the coils 52 will remain spaced apart a necessary distance. It will be appreciated that in order to maintain the melt at a uniform temperature of say 625° F., the heater element 40 must be very hot and the heat must be transferred away from it quickly and applied relatively evenly along the hot runner passage. Thus, it is important that there be a predetermined thickness of berylluim copper alloy surrounding the coils 52 at all locations to prevent the element 40 from burning out and to provide for adequate heat transfer. After the element 40 has been cast into a heater cast 20 and installed in an operating injection molding system, replacing a burnt out element is a very costly operation. The required minimum thickness of conductive material is dependent upon a number of factors such as operating temperatures and the structure and composition of the various components, all of which are taken into account in predetermining the size of the spacer clips 56.

Figure 3:
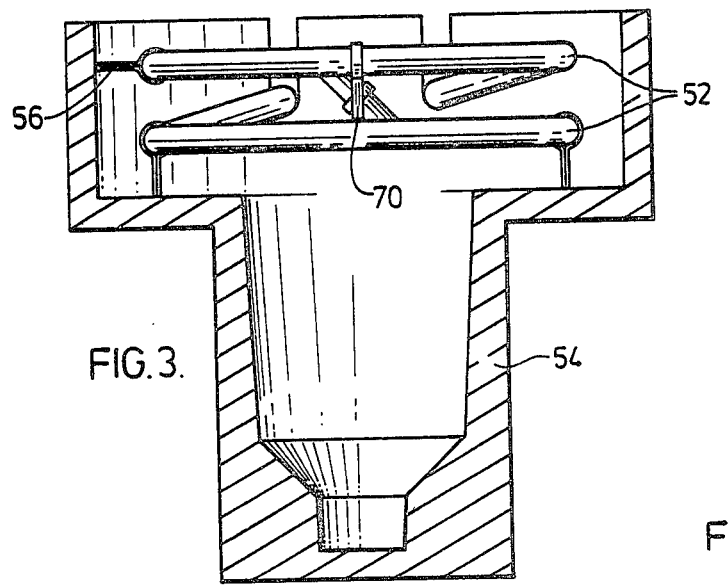
FIG. 3 is a sectional view of the heater cast in the mold.
Figure 4:
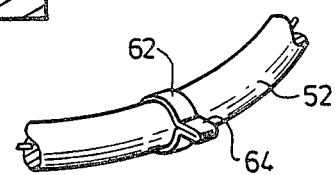
FIG. 4 is an isometric view showing a spacer clip according to a first embodiment of the invention in position on a coil of the heating element.
Figure 5:
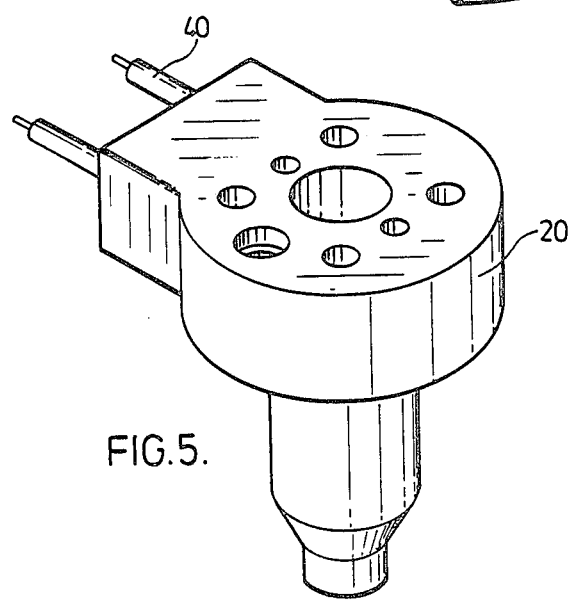
FIG. 5 is an isometric view of a completed heater cast.

In this embodiment, each spacer clip 56 is formed of an endless band 58 of material having a uniform rectangular cross section. The band 58 forms a central opening 60 therethrough which is initially substantially larger than the external diameter of the heating element 40. The spacer clips 56 are assembled onto the heating element 40 by slipping them over one end of the element 40 and sliding them along the coils 52 to predetermined positions. Each clip 56 is then oriented in a predetermined direction and crimped to secure it to the coil 52 in that position. After crimping, as shown in FIG. 4, the band 58 of each spacer clip 56 has a first portion 62 and a second portion 64. The first portion 62 extends around the coil 52 and is crimped against it tightly enough to secure the spacer clip against either longitudinal or rotational motion. The second portion 64 has two radially extending lengths 66,68 which are crimped together to form a rigid radially extending finger 70 of a determined length. The band 58 must be formed of a material which has sufficient pliability to allow it to be crimped tightly around the coil 52 without excessive pliability which would result in it not being reliably secured in the desired position and orientation. Furthermore, this must be combined with the necessary strength to maintain the radially extending finger on a rigid position. In this preferred embodiment, the band 58 is formed of stainless steel, although it may be formed of other materials having the necessary characteristics as to withstand the casting temperatures without loosing location or position. When the heating element 40 is inserted into the mold, as shown in FIG. 3, the clips 56 must be securely attached to the coils 52 and their fingers 70 sufficiently rigid to maintain the heating element in the desired position in the mold until after casting. When the heater cast 20 is removed from the mold 54 and machined to provide the finished product shown in FIG. 5, there are no extensive fault lines formed by the spacer clips 56, as was the case in the prior art.

Figure 6:
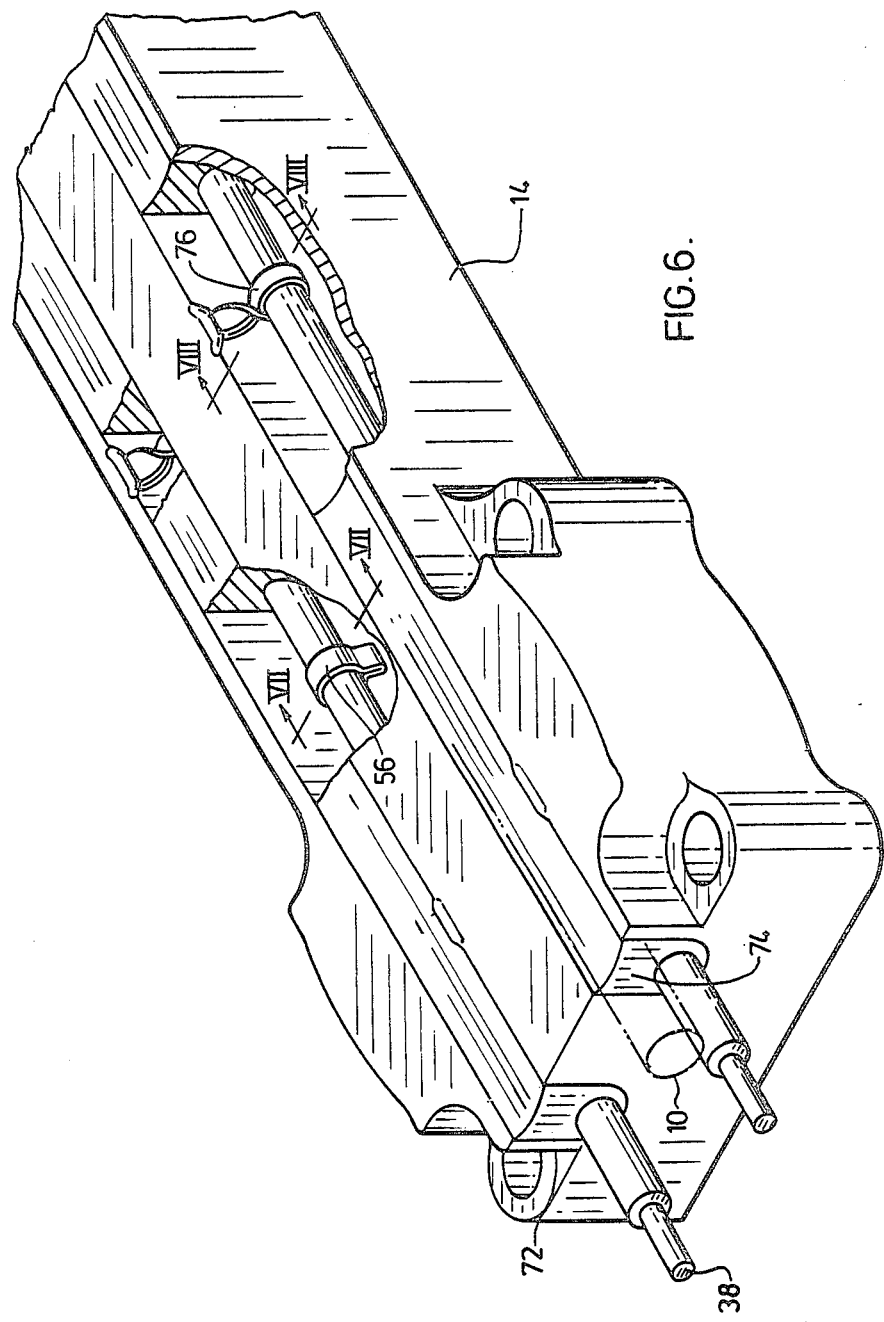
FIG. 6 is a partial cut-away isometric view of a manifold as seen in FIG. 1 having a heating element located by spacer clips according to preferred embodiments of the invention.

FIG. 6 is a view of a portion of manifold 14 such as that shown in FIG. 1. It is formed of a suitable material such as H13 steel and, as may be seen, has two channels 72,74 to receive the elongated electric heating element 38. The channels 72,74 surrounding the heating element 38 are filled with a highly conductive material to quickly and evenly transfer the heat away from the element 38 to the manifold 14 and the melt flowing through it. As described above in regard to the coiled heating element 40 in the heater cast 20, it is very important that the heating element 38 be accurately and reliably fixed in the channels 72,74 so that there is a uniform predetermined thickness of conductive material surrounding it to transfer the heat away. This is provided by a number of clips 56,76 spaced along its length.

Figure 7:
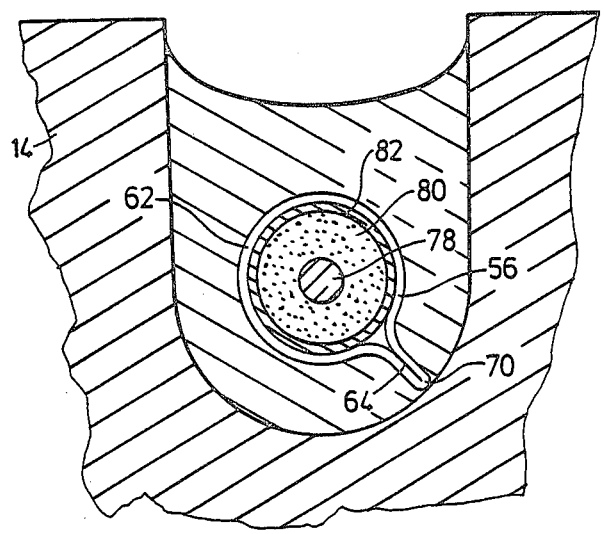
FIG. 7 is a sectional view along line VII—VII in in FIG. 6 showing a spacer clip according to a first embodiment of the invention.
Figure 8:
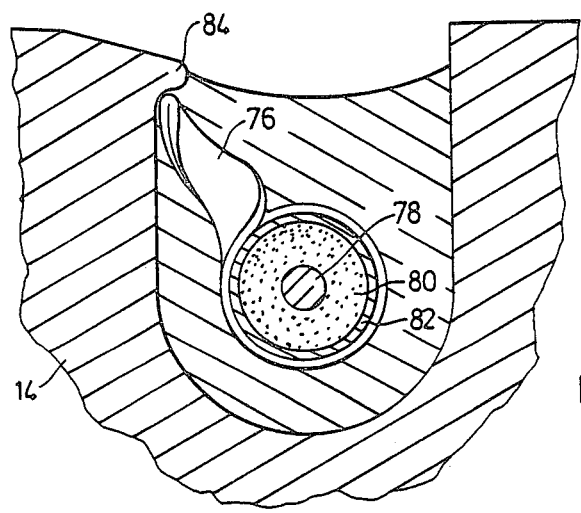
FIG. 8 is a sectional view along line VIII—VIII in FIG. 6 showing a spacer clip according to a second embodiment of the invention.

As more clearly seen in FIGS. 7 and 8, these spacer clips are provided according to a first embodiment 56 and a second embodiment 76. Both embodiments are formed of a band 58 of material which forms an opening 60 therethrough, as described above. Each band 58 is slipped over one end of the heating element 38 and slid along to a desired position where it is oriented in a certain direction and then crimped to attach it to the heating element 38. When it is crimped, each clip has a first portion 62 which extends tightly around the heating element 38 and a radially extending second portion 64 which forms a finger 70. While the finger 70 is formed of a double thickness of the band material to make it rigid, the difference between the first embodiment 56 and the second embodiment 76 is that the second embodiment has a longer finger 70 and it is twisted following crimping to give it increased rigidity.

Referring still to FIGS. 7 and 8, the electric heating element 38 is formed with a central resistance were 78 formed of a material such as a nickel chromium alloy surrounded by a refractory powder electrical insulating material 80 such as compacted magnesium oxide powder. This is enclosed in a pliable metal sheath 82 formed of a material such as Inconel and stainless steel clips 56 according to the first embodiment are positioned along the heating element 38 and oriented to space it from the bottom and walls of the channels 72,74 by at least the length of the rigid finger 70. Clips 76 according to the second embodiment are also crimped in positions along the heating element, but they have the longer twisted fingers 70 which angle upwardly to contact lip portions 84 which have been formed by burring the manifold 14 adjacent the channels 72,74. This retains the heating element 38 down in the channels against any upward forces applied by the conductive material when it is introduced into the channels around the heating element.

Although the description of this invention has been given with respect to two preferred embodiments of the spacer clips, it is not to be construed in a limiting sense. Variations and modifications may now occur to those skilled in the art. For instance, clips of different shapes with different relative dimensions may be used. For a definition of the invention, reference is made to the attached claims.

What I claim is:

1. The combination of a spacer clip and a tubular elongated injection molding electric heating element, the spacer clip comprising an endless band having a rectangular shaped cross section which forms an opening therethrough, the diameter of the opening being greater than the diameter of the heating element whereby an end of the heating element may be inserted through the opening and the band slipped along the heating element to a predetermined position, the band being crimped around the heating element whereby a first portion of the band is forced into contact against the outer surface of the heating element and a second portion of the band is shaped to form a radially extending finger, the band being formed of a material having a combination of the necessary strength and pliability whereby the contact between the first portion of the band and the heating element secures the clip in said position and in a predetermined orientation against longitudinal or rotational motion relative to the heating element and the finger has sufficient rigidity to provide a miminum spacing from a body against which the finger projects at least equal to the length of the finger.

2. A combination as claimed in claim 1 wherein the opening through the band is generally circular and the heating element has a generally circular shaped uniform cross section, the diameter of the opening being greater than the external diameter of the heating element.

3. A combination as claimed in claim 1 wherein the second portion of the band has two radially extending lengths which are crimped against each other to form the rigid finger.

4. A combination as claimed in claim 3 wherein the crimped second portion of the band is twisted to provide the projecting finger with increased rigidity.

5. A combination as claimed in claim 1 or 2 wherein the band is formed of stainless steel.

* * * * *